(12) United States Patent
Hallundbæk

(10) Patent No.: US 9,359,844 B2
(45) Date of Patent: Jun. 7, 2016

(54) DOWNHOLE DRIVING UNIT HAVING A SPRING MEMBER FOR ASSEMBLING A HYDRAULIC MOTOR HOUSING

(75) Inventor: Jørgen Hallundbæk, Græsted (DK)

(73) Assignee: WELLTEC A/S, Allerød (DK)

( * ) Notice: Subject to any disclaimer, the term of this patent is extended or adjusted under 35 U.S.C. 154(b) by 282 days.

(21) Appl. No.: 14/008,160

(22) PCT Filed: Mar. 29, 2012

(86) PCT No.: PCT/EP2012/055636
§ 371 (c)(1),
(2), (4) Date: Sep. 27, 2013

(87) PCT Pub. No.: WO2012/130938
PCT Pub. Date: Oct. 4, 2012

(65) Prior Publication Data
US 2014/0014367 A1      Jan. 16, 2014

(30) Foreign Application Priority Data
Mar. 30, 2011   (EP) ..................................... 11160502

(51) Int. Cl.
*E21B 4/00*   (2006.01)
*E21B 23/04*  (2006.01)
(Continued)

(52) U.S. Cl.
CPC .............. *E21B 23/04* (2013.01); *B60K 7/0015* (2013.01); *E21B 4/006* (2013.01); *E21B 4/02* (2013.01);
(Continued)

(58) Field of Classification Search
USPC ............. 166/381, 55, 55.7, 104; 175/107, 51, 175/99; 180/305, 308, 55
See application file for complete search history.

(56) References Cited

U.S. PATENT DOCUMENTS

| 3,090,361 A | 5/1963 | Orshansky, Jr. et al. |
| 3,439,766 A * | 4/1969 | Frost ..................... B60K 17/046 180/308 |

(Continued)

FOREIGN PATENT DOCUMENTS

| EP | 1 281 834 | 2/2003 |
| FR | 1 369 490 | 8/1964 |
| WO | WO 92/10676 | 6/1992 |

OTHER PUBLICATIONS

International Preliminary Report on Patentability issued in International Patent Application No. PCT/EP2012/055636 issued on Oct. 1, 2013.

(Continued)

*Primary Examiner* — Taras P Bemko
(74) *Attorney, Agent, or Firm* — Nixon & Vanderhye P.C.

(57) ABSTRACT

The present invention relates to a downhole driving unit (11) for insertion into a well, comprising a driving unit housing (51), a hydraulic motor (23) comprising a hydraulic motor housing (93), a wheel assembly (90) comprising a stationary part (91) and a rotational part (92), the stationary part being connected with the driving unit housing and being rotatably connected with the rotational part, the stationary part and the rotational part constituting the hydraulic motor housing, the rotational part comprising a wheel ring (99) closed from one end, wherein the wheel assembly comprises a spring member (113) assembling the hydraulic motor housing. The present invention also relates to a downhole system comprising the driving unit according to the invention and an operational tool connected with the driving unit for being moved forward in a well or borehole as well as to a use of the driving unit according to the invention in a well or borehole for moving itself and/or an operational tool forward in a well or borehole.

19 Claims, 19 Drawing Sheets

(51) Int. Cl.
  *B60K 7/00* (2006.01)
  *E21B 4/18* (2006.01)
  *E21B 23/00* (2006.01)
  *E21B 23/14* (2006.01)
  *E21B 33/076* (2006.01)
  *E21B 47/01* (2012.01)
  *E21B 4/02* (2006.01)
  *E21B 29/00* (2006.01)
  *B60K 17/04* (2006.01)

(52) U.S. Cl.
  CPC . *E21B 4/18* (2013.01); *E21B 23/00* (2013.01); *E21B 23/14* (2013.01); *E21B 29/002* (2013.01); *E21B 33/076* (2013.01); *E21B 47/01* (2013.01); *B60K 17/046* (2013.01); *B60K 2007/0038* (2013.01); *B60K 2007/0092* (2013.01); *B60Y 2200/60* (2013.01)

(56) References Cited

U.S. PATENT DOCUMENTS

| | | | |
|---|---|---|---|
| 4,024,931 A * | 5/1977 | Klaue | B60T 1/06 188/18 A |
| 4,930,590 A | 6/1990 | Love et al. | |
| 5,391,059 A | 2/1995 | Hallundbaek | |
| 6,273,189 B1 * | 8/2001 | Gissler | E21B 4/04 166/241.1 |
| 9,051,802 B2 * | 6/2015 | Hallundbaek | B60K 7/0015 |
| 2003/0024710 A1 | 2/2003 | Post et al. | |

OTHER PUBLICATIONS

International Search Report for PCT/EP2012/055636 mailed May 7, 2012.
Written Opinion of the International Searching Authority for PCT/EP2012/055636 mailed May 7, 2012.

* cited by examiner

DOWNHOLE DRIVING UNIT HAVING A SPRING MEMBER FOR ASSEMBLING A HYDRAULIC MOTOR HOUSING

This application is the U.S. national phase of International Application No. PCT/EP2012/055636 filed 29 Mar. 2012 which designated the U.S. and claims priority to EP 11160502.8 filed 30 Mar. 2011, the entire contents of each of which are hereby incorporated by reference.

FIELD OF THE INVENTION

The present invention relates to a downhole driving unit for insertion into a well, comprising a driving unit housing, a hydraulic motor comprising a hydraulic motor housing, a wheel assembly comprising a stationary part and a rotational part, the stationary part being connected with the driving unit housing and being rotatably connected with the rotational part. The present invention also relates to a downhole system comprising the driving unit according to the invention as well as to a use of the driving unit.

BACKGROUND ART

When operating in a downhole well, tools used for the operation may not be submergible themselves. Some tools are positioned at the front of coiled tubing and are driven forward by pushing the tubing further down the well. Other tools are lowered into the well by means of a wireline, and gravity will thus ensure that the tool submerges. Hence, not all tools are capable of moving in the well and thus need to be moved forward in the well by an additional tool. In particular, this is the case in the horizontal part of the well, as gravity cannot aid in the movement.

Several tools have been developed for this purpose, inter alia one running on a caterpillar track. However, this tool has the disadvantage that it cannot always hold its footing in the more uneven parts of the well, and in some cases it is impossible for such a tool to pass a place where two well pipes meet but do not abut hence leaving a gap. Another tool has wheels driven by means of a roller chain and all driven by one motor. However, if the motor is unable to drive all wheels, the tool is unable to drive itself any further. This may be the case if the well has an obstacle and one wheel is unable to be driven across the obstacle.

Well tools often utilise hydraulics for performing operations or providing propulsion in transportation tools, also denoted as well tractors. Supplying pressurised hydraulic fluid to various parts of a downhole tool requires a reliable and robust hydraulic system, as tools in the well cannot be accessed easily.

Especially the supply of hydraulic fluid into moving parts of a downhole tool is challenging. Furthermore, preventing dirty well fluid from entering hydraulic movable parts can be challenging.

SUMMARY OF THE INVENTION

It is an object of the present invention to wholly or partly overcome the above disadvantages and drawbacks of the prior art. More specifically, it is an object to provide an improved downhole tool for moving an operational tool forward in all parts of a well and also in wells having a small inner diameter, such as 2⅛ inches, while preventing well fluid from entering hydraulic, movable parts.

The above objects, together with numerous other objects, advantages, and features, which will become evident from the below description, are accomplished by a solution in accordance with the present invention by a downhole driving unit for insertion into a well, comprising:
 a driving unit housing,
 a hydraulic motor comprising a hydraulic motor housing, and
  a wheel assembly comprising a stationary part and a rotational part, the stationary part being connected with the driving unit housing and being rotatably connected with the rotational part, the stationary part and the rotational part constituting the hydraulic motor housing, the rotational part comprising a wheel ring closed from one end,
wherein the wheel assembly comprises a spring member assembling the hydraulic motor housing.

In one embodiment, the downhole driving unit for insertion into a well may comprise:
 a driving unit housing,
 a hydraulic motor comprising a hydraulic motor housing, and
  a wheel assembly comprising a stationary part and a rotational part, the stationary part being connected with the driving unit housing and being rotatably connected with the rotational part, the stationary part and the rotational part constituting the hydraulic motor housing, the rotational part comprising a wheel ring closed from one end,
wherein the wheel assembly comprises a spring member connecting the stationary part with the rotational part or connecting a first part of the rotational part with a second part of the rotational part.

Said spring member may assemble the hydraulic motor housing by connecting the stationary part with the rotational part or connecting a first part of the rotational part with a second part of the rotational part.

By closing the wheel by means of a spring member, the wheel hosing is capable of functioning also as the hydraulic motor housing since the wheel housing can be made sufficiently tight to comprise the hydraulic fluid flowing in the hydraulic motor housing.

In one embodiment, the first part may be the wheel ring and the second part may be a closing member closing the wheel ring from the one end.

Further, the wheel ring may comprise the closing member.

Moreover, the stationary part may be a cam ring of the hydraulic motor.

The wheel assembly may further comprise a sealing member arranged between the stationary part and the rotational part or between a first part of the rotational part and a second part of the rotational part.

In addition, the sealing member may be a sealing ring, such as an O-ring, a sealing layer, or a sealing disc.

Said sealing layer or sealing disc may cover most of the closing member.

In another embodiment, the wheel assembly may be suspended in the driving unit housing.

Furthermore, the spring member may be a circlip or a snap ring.

Additionally, the spring member may be ring-shaped and may have a gap so that when inserting the ring, the ring can be squeezed together to obtain a smaller diameter and then spring back to its original diameter when released again.

Moreover, the rotational part may comprise a wheel ring, and a bearing may be arranged between the cam ring and the wheel ring.

In one embodiment, the hydraulic motor may be a radial piston motor.

The downhole driving unit according to the invention may further comprise an arm assembly movable between a retracted position and a projecting position in relation to the driving unit housing, and the arm assembly may be connected with or form part of the stationary part of the wheel assembly.

Furthermore, the downhole driving unit according to the invention may comprise an arm activation assembly arranged in the driving unit housing for moving the arm assembly between the retracted position and the projecting position.

Also, the wheel assembly may further comprise a planetary gearing system.

The planetary gearing system may be comprised in the hydraulic motor housing.

In addition, the planetary gearing system may comprise planet gears engaging the sun gear and the ring gear, the planet gears being interconnected by means of a carrier member.

Moreover, the hydraulic motor may have a rotatable section which is connected with a sun gear of the planetary gearing system.

Additionally, the sun gear of the planetary gearing system may drive a plurality of planet gears which are connected through a carrier member for driving a ring gear of the planetary gearing system.

The wheel ring may comprise the ring gear enabling the planet gears to engage and drive the wheel ring.

Said planetary gearing system may be comprised in the hydraulic motor housing.

Further, the planetary gearing system may comprise a ring gear constituted by the wheel ring or the closing member.

Also, the rotatable section may comprise a first sun gear of the planetary gearing system driving a plurality of planet gears which are connected through a carrier member being connected with or comprised in the wheel ring, the stationary part may comprise a ring gear of the planetary gearing system, and the ring gear may engage the planet gears.

Moreover, the rotatable section of the hydraulic motor may be connected with the planet gears and the planet gears may be driven by the rotatable section.

Furthermore, the stationary part may comprise the sun gear of the planetary gearing system.

The rotational part may comprise the wheel ring and may be driven by the planet gears.

In addition, the rotatable section of the hydraulic motor may comprise a first sun gear of the planetary gearing system and the first sun gear may drive a plurality of first planet gears which are connected through a carrier member.

In one embodiment, the carrier member of the planetary gearing system may drive a plurality of second planet gears and the carrier member may comprise the sun gear engaging and driving the second planet gears.

Further, the second planet gears may be connected by means of a second carrier member being part of the rotational part for rotating part of the wheel assembly.

Said second carrier member may be connected with the rotational part of the wheel assembly or may be part of the rotational part.

Moreover, the stationary part may comprise the ring gear of the planetary gearing system engaging the first planet gears and the second planet gears.

Also, the arm assembly may comprise a wheel arm and the wheel arm may comprise fluid channels for providing fluid to and from the hydraulic motor through the stationary part.

In one embodiment, the rotatable section may be a hydraulic cylinder block.

Said hydraulic motor may comprise pistons movable within cylinders in the hydraulic cylinder block.

Also, the hydraulic cylinder block may comprise cylinders in which a piston moves in each of the cylinders, the piston comprising a piston body and a ball bearing suspended in a piston body so that the ball bearing abuts the cam ring.

Additionally, the hydraulic cylinder block may comprise fluid channels arranged in alignment with the fluid channels in the wheel arm so that fluid is led from the wheel arm to cylinders in the hydraulic cylinder block.

The downhole driving unit according to the invention may further comprise a pump for providing fluid to the hydraulic motor.

The present invention further relates to a downhole system comprising the driving unit according to the invention and an operational tool connected with the driving unit for being moved forward in a well or borehole.

The operational tool may be a stroker tool, a key tool, a milling tool, a drilling tool, a logging tool, etc.

Finally, the present invention relates to a use of the driving unit according to the invention in a well or borehole for moving itself and/or an operational tool forward in a well or borehole.

BRIEF DESCRIPTION OF THE DRAWINGS

The invention and its many advantages will be described in more detail below with reference to the accompanying schematic drawings, which for the purpose of illustration show some non-limiting embodiments and in which.

All the figures are highly schematic and not necessarily to scale, and they show only those parts which are necessary in order to elucidate the invention, other parts being omitted or merely suggested.

DETAILED DESCRIPTION OF THE INVENTION

Figure 1:
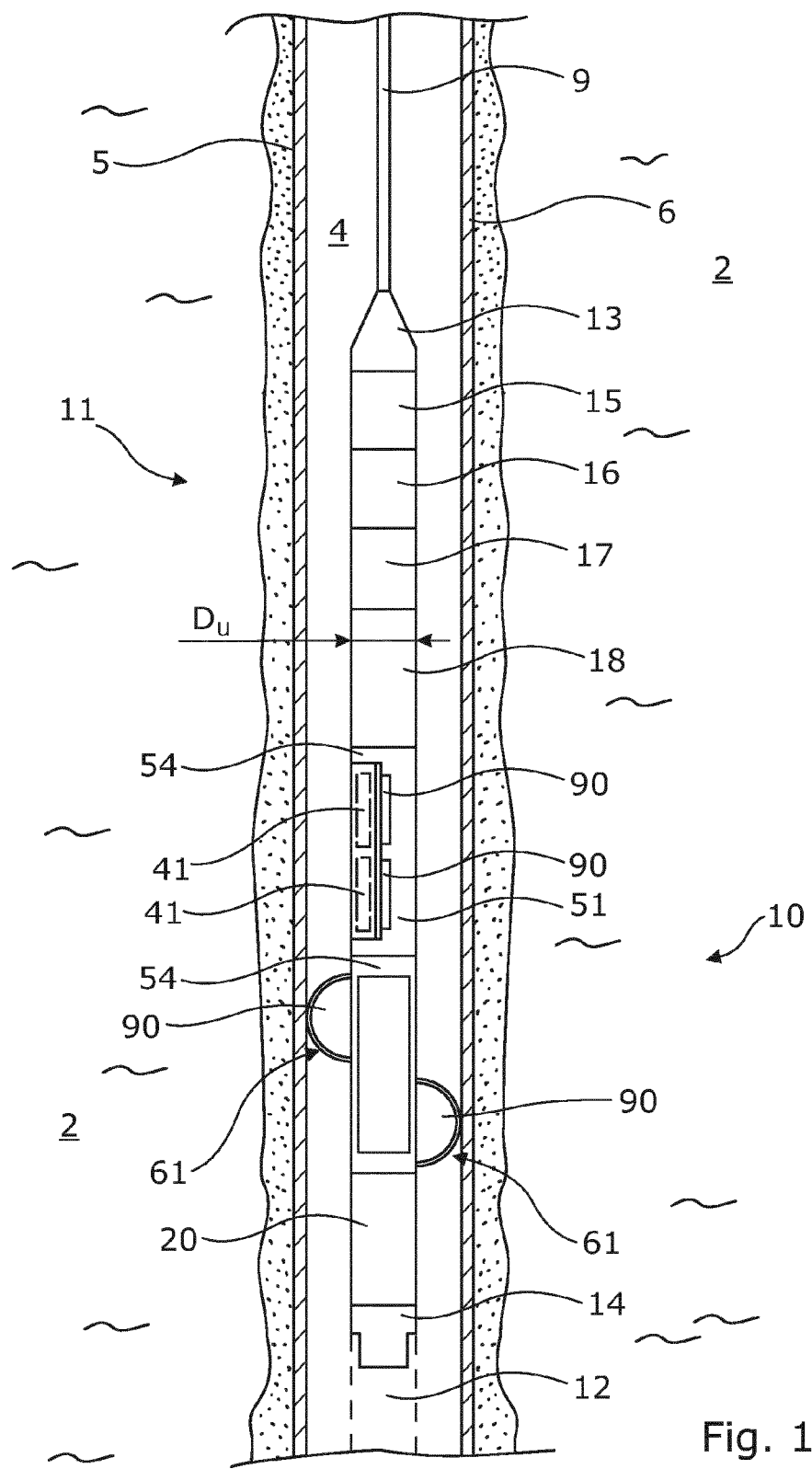
FIG. 1 shows a downhole tool such as a driving unit in a well.

FIG. 1 shows a downhole tool 10, such as driving unit 11, arranged in a casing 6, having an inside 4, in a well or borehole 5 in the formation 2. The downhole tool is powered through a wireline 9 which is connected with the tool via a top connector 13. The downhole tool further comprises an electronic section having mode shift electronics 15 and control electronics 16 before the electricity is supplied to an electrical motor 17 driving a hydraulic pump 18. In FIG. 1, the downhole tool is a driving unit 11 having a driving unit housing 51 in which wheel assemblies 90 are suspendedly connected. The driving unit 11 is divided in several sections 54 and is connected with a compensating device 20 for compensating the pressure within the driving unit so that a high pressure does not result in the driving unit housing bulging outwards or collapsing inwards.

Figure 2:
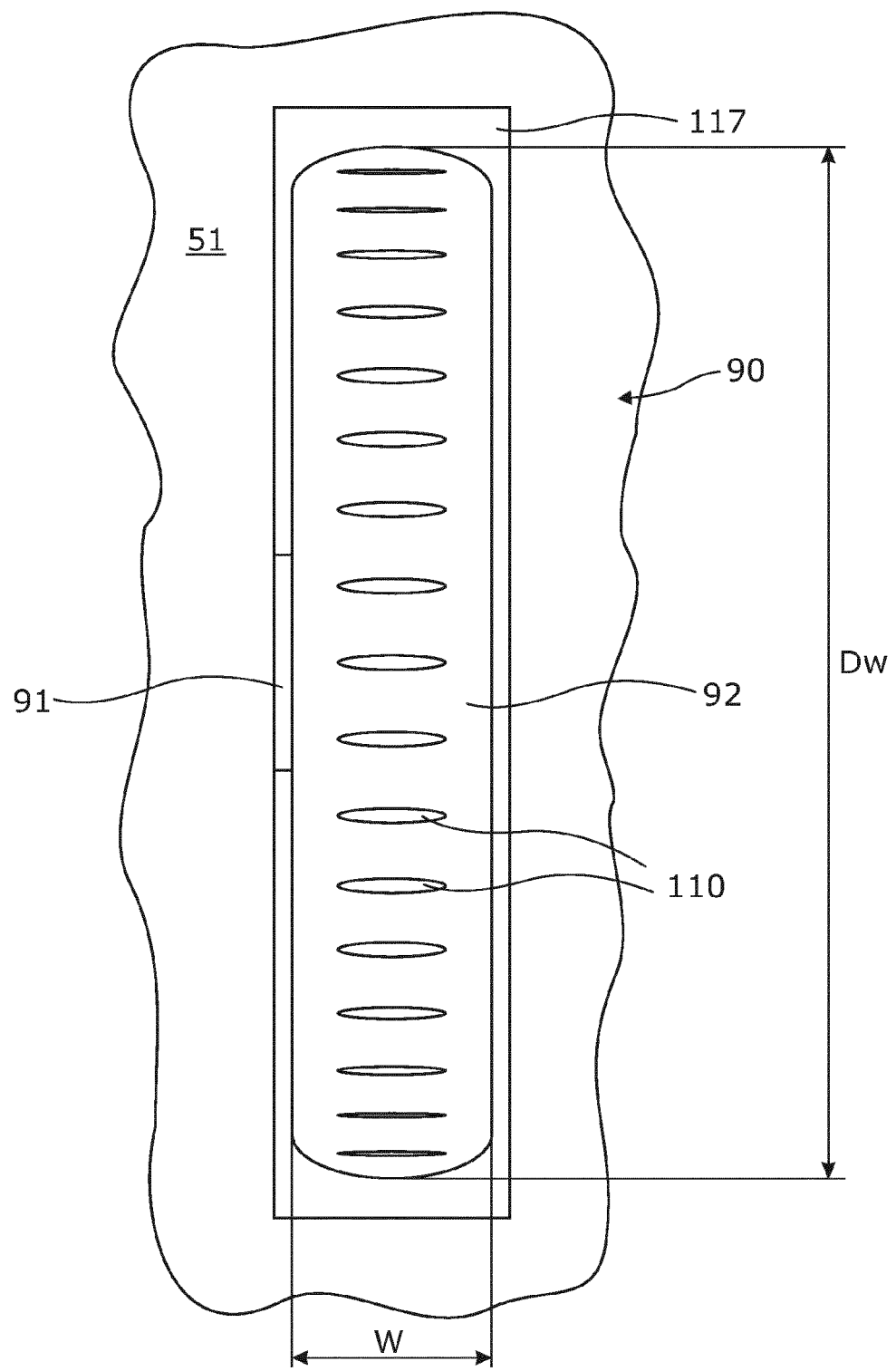
FIG. 2 shows the wheel shown in FIG. 1 in another view.

As shown in FIG. 1, part of the wheel assembly 90 projects from the driving unit housing 51 and the other part remains in a slot 117 in the driving unit housing as shown in FIG. 2. The wheel assembly 90 comprises a stationary part 91 and a rotational part 92. The stationary part 91 is connected with the driving unit housing 51 and is rotatably connected with the rotational part 92.

Figure 3:
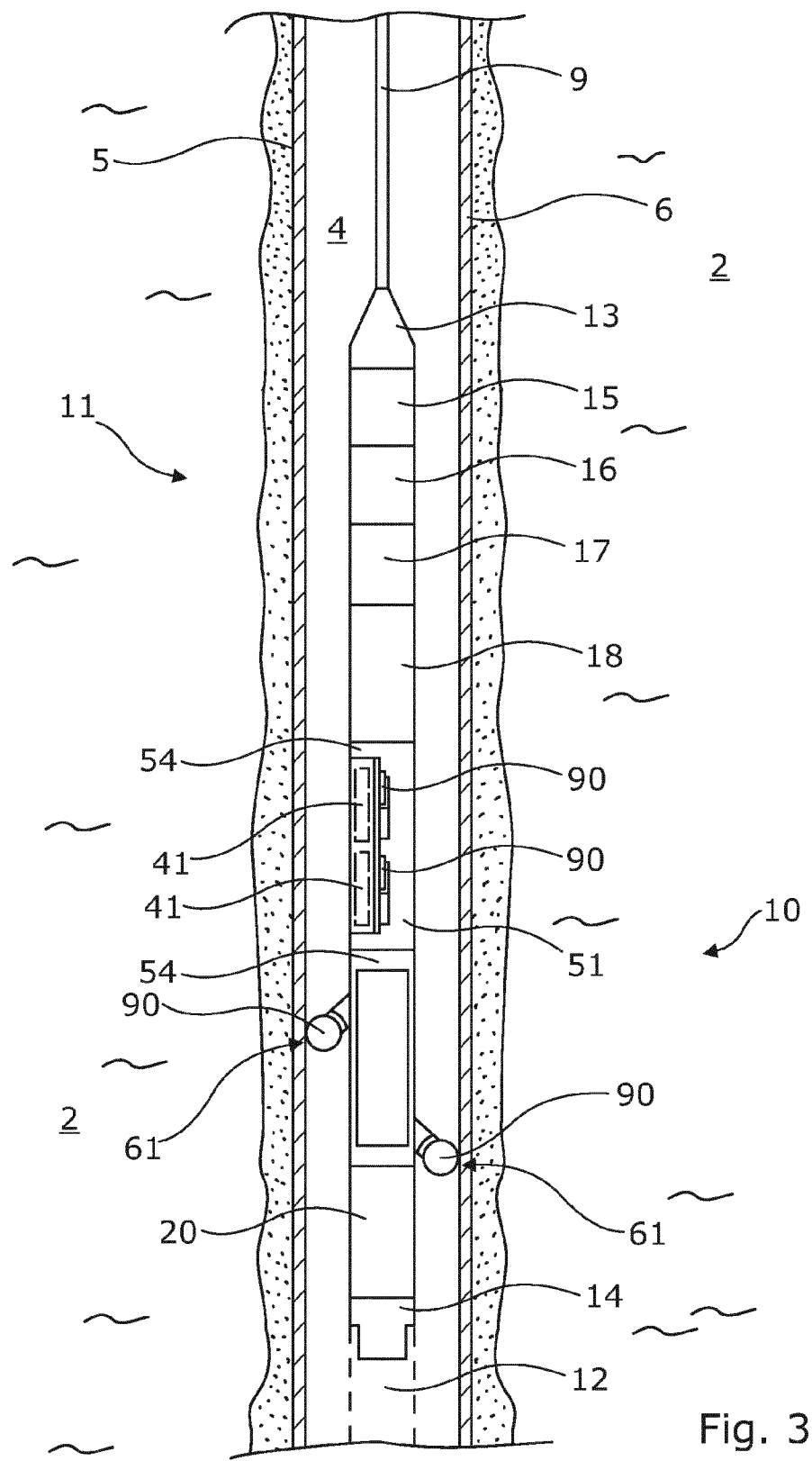
FIG. 3 shows another downhole tool such as a driving unit in a well.
Figure 4:
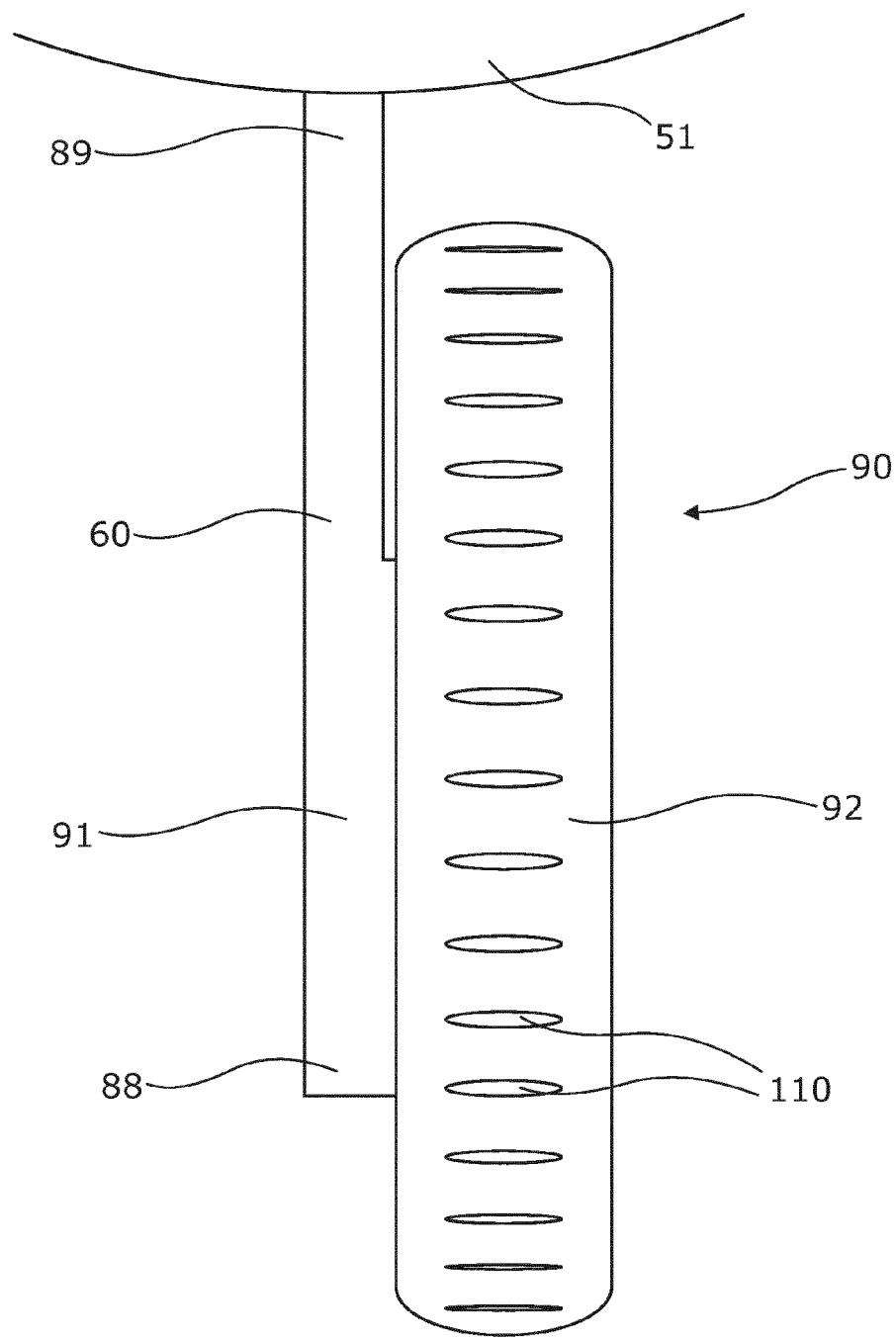
FIG. 4 shows the wheel shown in FIG. 3 in another view.

In FIG. 3, the downhole tool is also a driving unit 11 having a driving unit housing 51 in which arm assemblies 60 are moved between a retracted position and a projecting position in relation to the driving unit housing 51 along a longitudinal axis of driving unit 11 by means of fluid from the hydraulic pump. In FIG. 3, an arm assembly 60 is shown in its projecting position. As shown in FIG. 4, part of the arm assembly 60 projects from the driving unit housing 51 and the other part is connected with the wheel assembly 90. The wheel assembly 90 comprises a stationary part 91 and a rotational part 92. The stationary part 91 is connected with the arm assembly 60 or forms part of the arm assembly and is rotatably connected with the rotational part 92.

The driving unit 11 may be inserted into a well and propels itself forward and is thus capable of moving an operational tool forward in the well. In order to be able to propel itself and the operational tool 12, the driving unit comprises several wheel assemblies 90, either suspended directly in the driving unit housing 51 or arranged in a first end 88 of the arm assembly 60 furthest away from the end 89 closest to the driving unit housing 51 when the arm is in its projecting position, as shown in FIGS. 3 and 4.

The rotational part 92 is fixedly connected with or forms part of a wheel ring 99 which is the outermost part of the wheel assembly 90 contacting an inner surface of the casing 6 or borehole 5. On its outside, the wheel ring 99 has indentations 110 to obtain a better grip in the casing wall or the borehole wall, as shown in FIGS. 2 and 4. The wheel ring 99 may also have any other friction enhancing means, such as spikes or grooves, and the wheel ring may comprise friction enhancing means made of rubber, elastomer, etc.

Figure 5A:
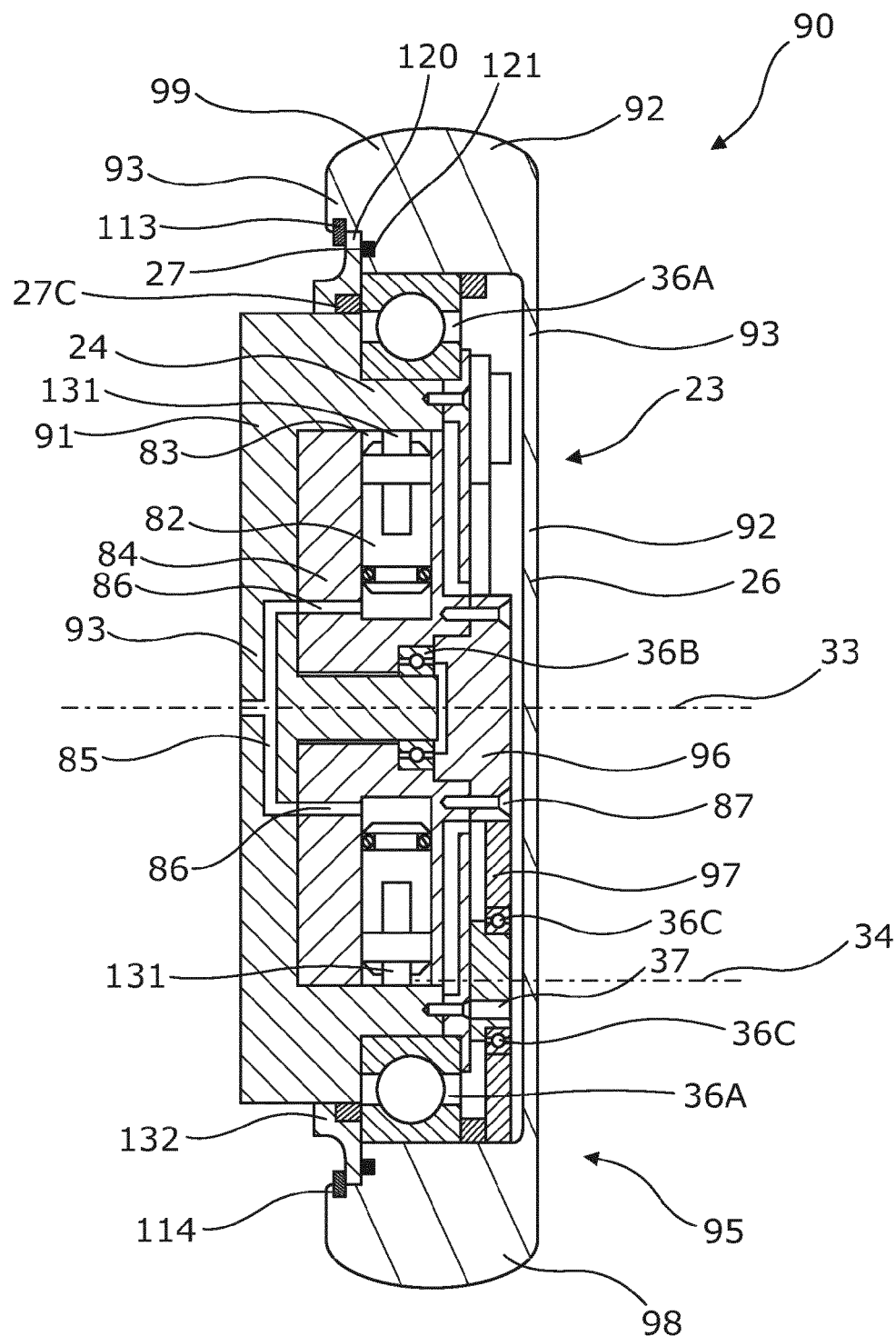
FIG. 5A shows a cross-sectional view of the wheel shown in FIG. 1.
Figure 5B:
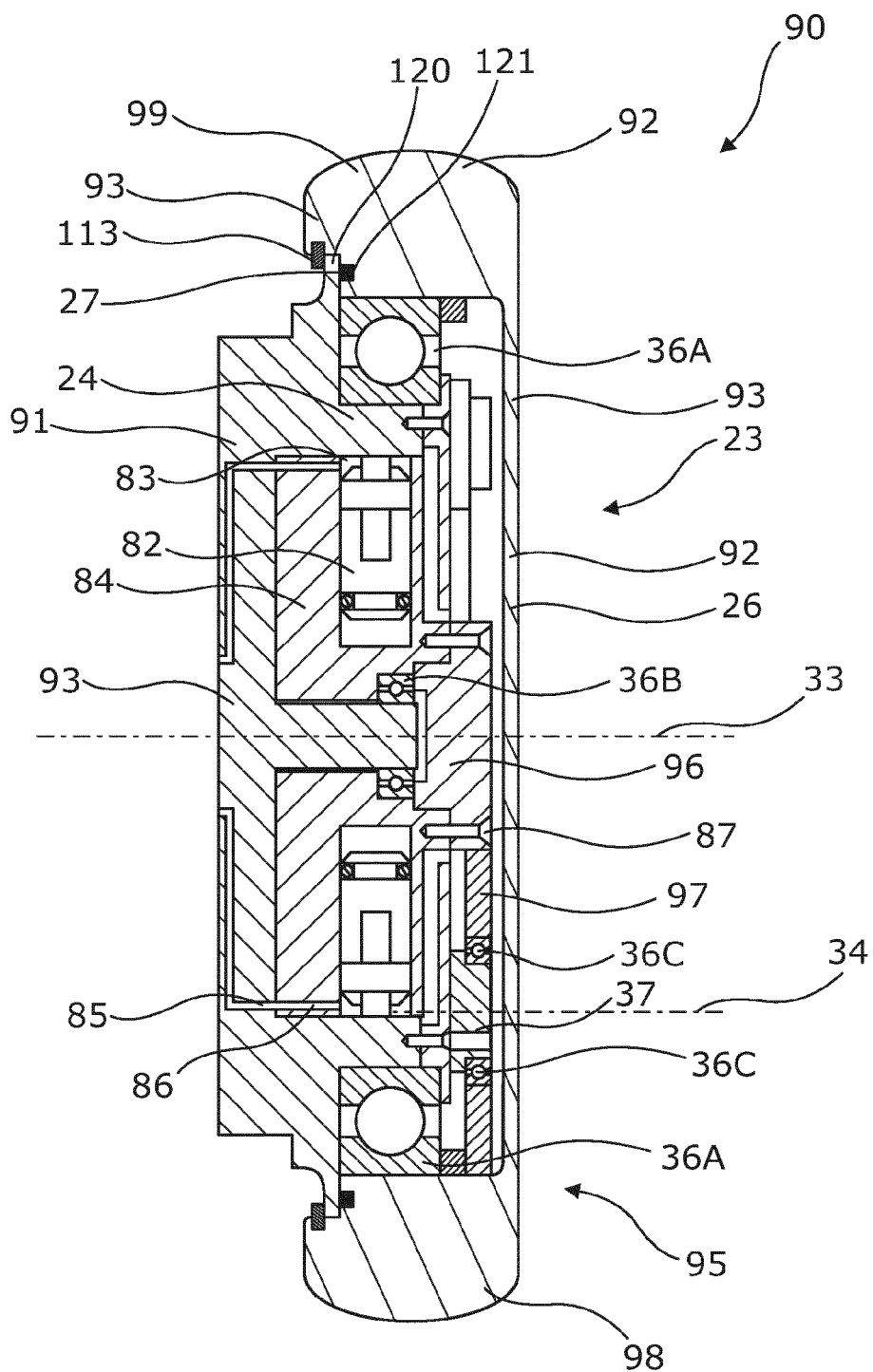
FIG. 5B shows another cross-sectional view of the wheel of FIG. 5A.

In FIGS. 5A and 5B, the wheel assemblies 90 are directly suspended in the driving unit housing 51, as shown in FIGS. 1 and 2. Thus, the stationary part 91 is suspended in the driving unit housing 51 and comprises fluid channels for supplying fluid to and from the hydraulic motor 23. The wheel assembly 90 rotates around a wheel rotation axis 33. In order to be able to propel itself forward in the well, each wheel assembly 90 comprises a hydraulic motor 23. The hydraulic motor 23 has a hydraulic motor housing 93 and a rotatable section 84 connected with the rotational part 92 for rotating part of the wheel assembly 90 and thus drive the wheel ring 99 and the driving unit 11 forward in the well. As shown, the stationary part 91 and the rotational part 92 constitute the hydraulic motor housing 93, and the wheel assembly 90 comprises a spring member 113 connecting the stationary part 91 with the rotational part 92 in order to assemble the hydraulic motor housing 93 and thus the wheel assembly 90. The spring member 113 is a snap ring or a circlip being a ring-shaped member having a gap so that when inserting the ring, the ring can be squeezed together to obtain a smaller outer diameter and then spring back to its original diameter when released again in a groove with which it is to engage.

In FIGS. 5A and 5B, the stationary part 91 is a cam ring 24 of the hydraulic motor 23 and the wheel ring 99 is closed from one end and open at the other end to engage the outer circumference of the cam ring 24. The wheel ring 99 has a groove 114 in which the snap ring 113 is inserted to engage and fasten a projecting flange 120 of a flange ring 132 (as shown in FIG. 5A) or the cam ring 24 (as shown in FIG. 5B) to the wheel ring 99. A sealing element 27C is arranged in between the flange ring 132 and cam ring. In a second groove 121 in the wheel ring 99, a sealing member 27 is arranged so as to seal between the cam ring 24 and the wheel ring 99 when squeezed together by the snap ring 113.

By having a snap ring 113 for connecting the wheel ring 99 and the cam ring 24, the hydraulic motor housing 93 is assembled in a simple manner without using e.g. a screw connection which may become leaky when the wheel is used, and dirty well fluid can thus enter the motor housing and small fragments in the well fluid may ruin the function of the motor and thus the rotation of the wheel. Furthermore, the seal between the wheel ring 99 and the cam ring 24 can be a face seal and the sealing member can be a conventional O-ring which is easily replaced.

The stationary part 91 and the rotational part 92 constitute the hydraulic motor housing 93, in which the rotatable section 84 of the hydraulic motor 23 rotates in relation to the cam ring 24 driving the rotational part 92 of the wheel assembly 90. Thus, the cam ring 24 is stationary and a ball bearing 36A is arranged on an outside of the cam ring 24 between the cam ring 24 and the wheel ring 99 in order to provide a simple and substantially friction-free transition between the rotatable wheel ring and the stationary cam ring. By arranging the transition between the rotational part 92 and the stationary part 91 of the wheel assembly 90 between the cam ring 24 and the wheel ring 99, a more friction-free transition is provided in that a ball bearing 36A can be arranged therebetween. Furthermore, a more fluid-tight hydraulic motor housing is provided. In FIGS. 5A-7, the bearing between the wheel ring 99 and the cam ring 24 is a ball bearing, but in another embodiment, the bearing may be another bearing providing a substantially friction-free transition between the cam ring 24 and the wheel ring 99.

Figure 6:
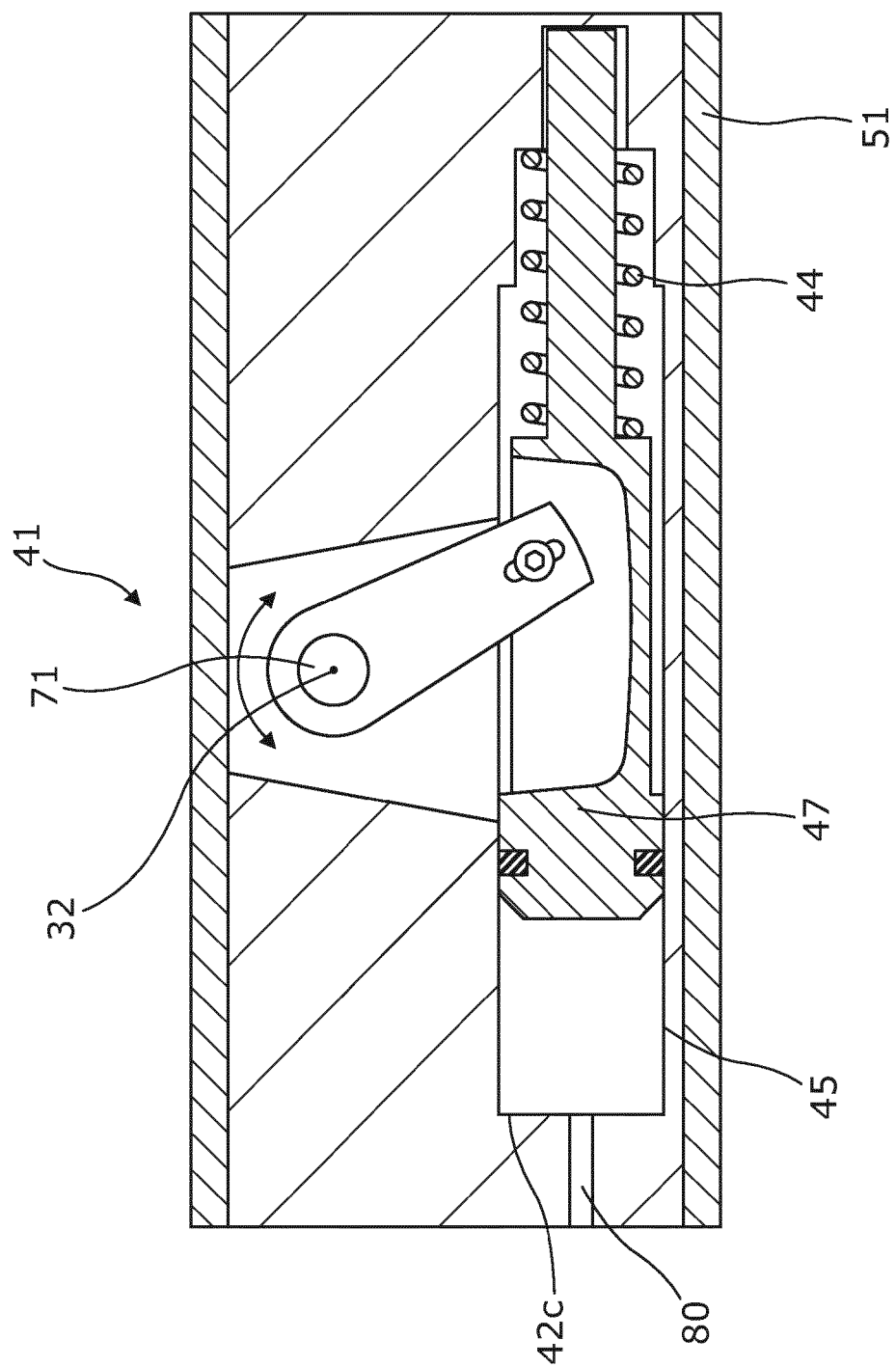
FIG. 6 shows an arm activation assembly.

In FIG. 6, the arm activation assembly 41 is shown which is arranged in the driving unit housing 51, as indicated in FIG. 1, for moving the arm assemblies between a retracted position and projecting position. The arm assembly is fastened to one end of a crank member 71 which is rotated around a rotation axis 32, as indicated by arrows. This end is rotatably connected in relation to the housing, and the other end of the crank member 71 is moved along the longitudinal axis of the driving unit 11 by means of a piston 47 moving in a piston housing 45. The piston is moved in a first direction by means of hydraulic fluid supplied through channel 80 by means of the pump and in an opposite and second direction by means of a spring member 44.

The arm assemblies 60 are moved in and out of the driving unit housing 51 between the projecting and retracted positions by means of an arm activation assembly 41 arranged in the driving unit housing 51 as indicated by the dotted lines. The arm activation assemblies 41 are driven by the hydraulic pump for moving the arm assemblies 60 through a hydraulic cylinder 42c. The driving unit 11 is most often used for moving an operational tool into a specific position in the well or just forward in the well while an operation is performed, such as moving a logging tool forward while logging fluid and formation data in order to optimise the production of oil fluid from the well. Another operational tool 12 could also be a stroker tool providing an axial force in one or more strokes, a key tool opening or closing valves in the well, positioning tools such as a casing collar locator (CCL), a milling tool or drilling tool, etc. The operational tool is connected through a connector 14.

Figure 7A:
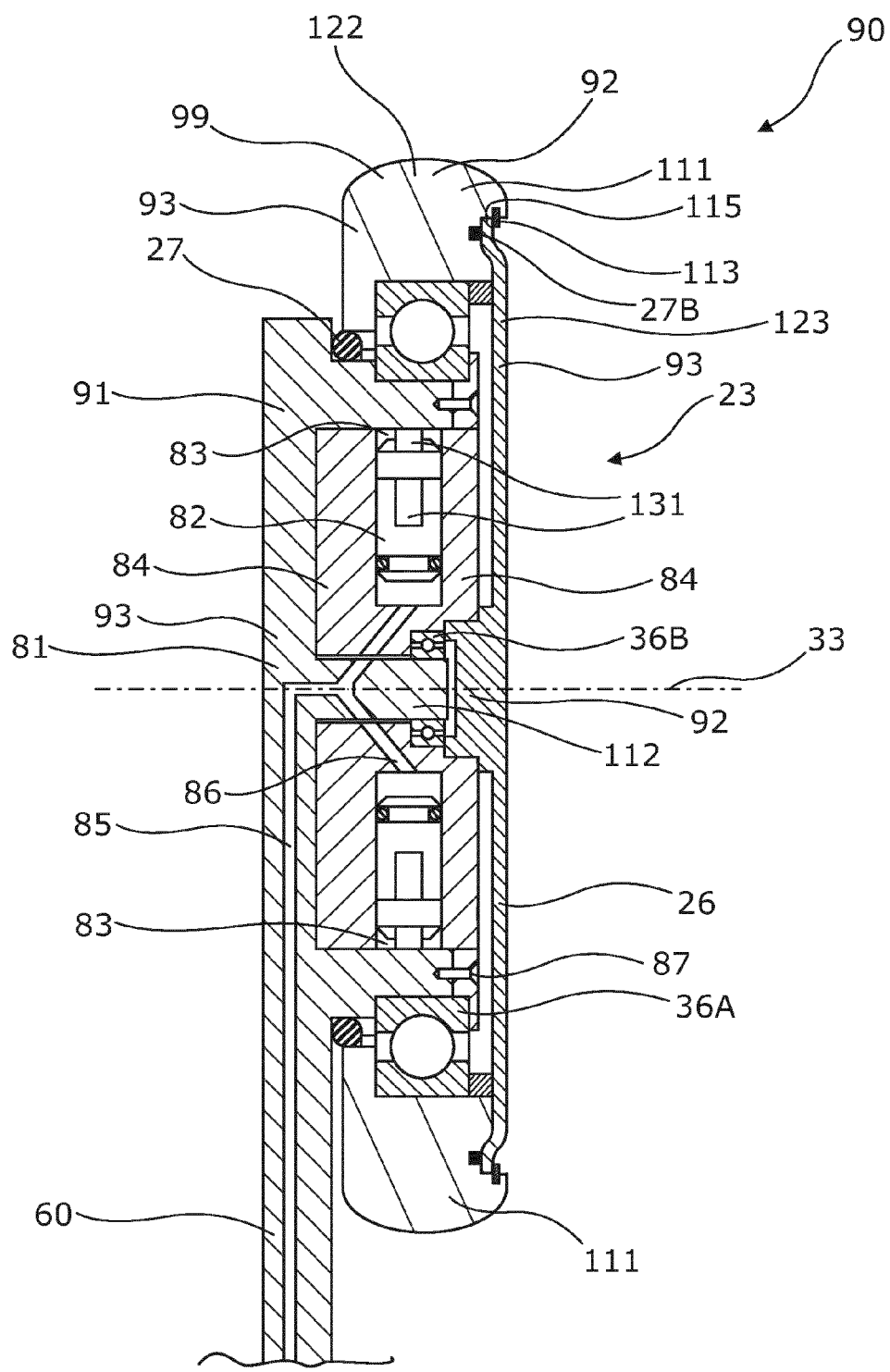
FIG. 7A shows a cross-sectional view of another embodiment of the wheel shown in FIG. 3.
Figure 7B:
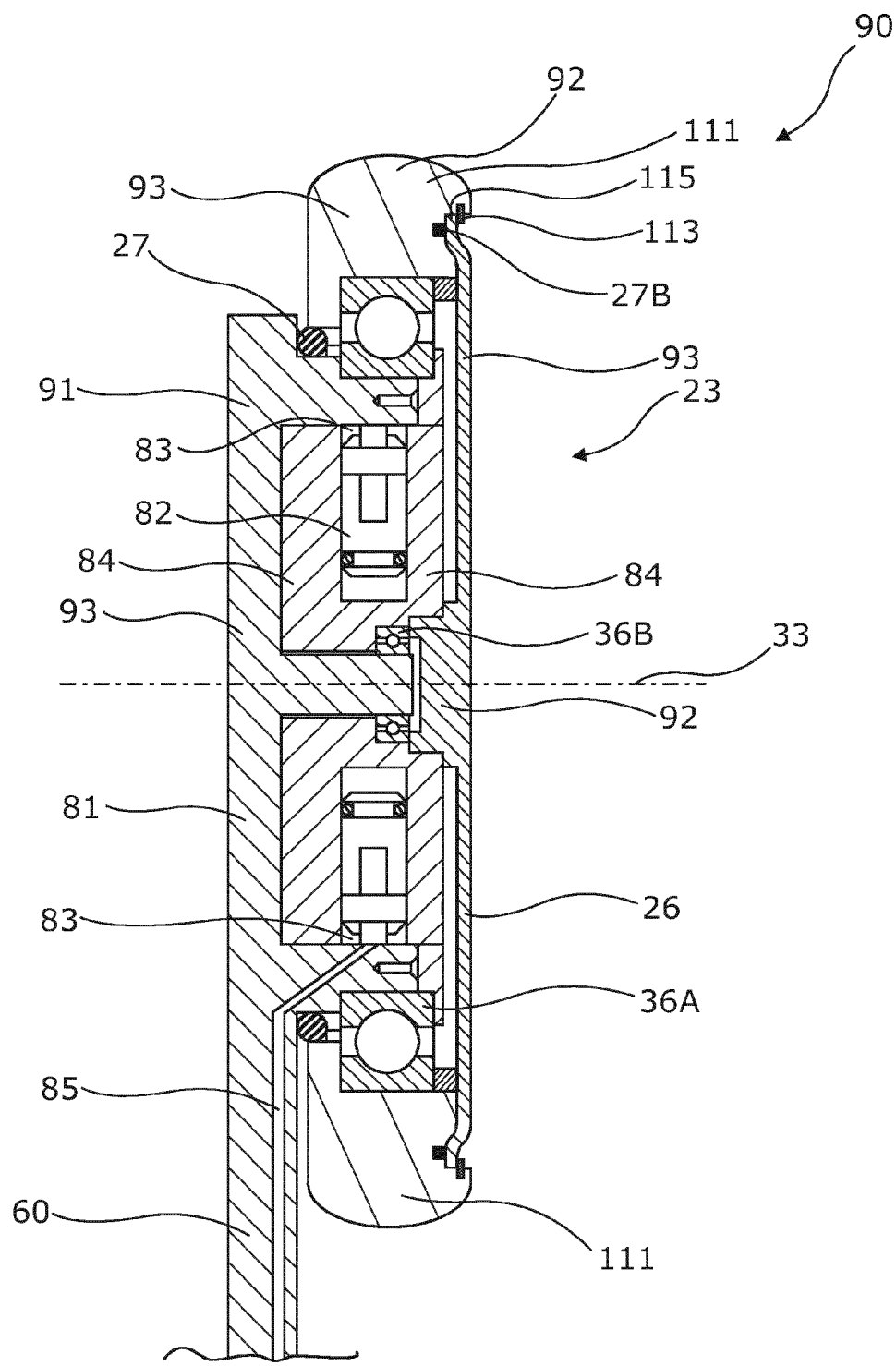
FIG. 7B shows another cross-sectional view of the wheel of FIG. 7A.

FIGS. 7A and 7B show a cross-sectional view of the wheel assembly in FIGS. 3 and 4. The wheel assembly 90 is connected with the driving unit housing 51 via a wheel arm 81 of the arm assembly 60, as shown in FIGS. 3 and 4. As shown, the wheel assembly 90 comprises a hydraulic motor 23 comprising a hydraulic motor housing 93 constituted by the stationary part 91 and the rotational part 92. The hydraulic motor 23 comprises a rotatable section 84 connected with the rotational part 92 for rotating part of the wheel assembly 90.

The wheel assembly 90 comprises a closing member 26 closing the wheel ring 99 from an end 111, and the hydraulic motor 23 is thus enclosed by the wheel arm 81, the wheel ring 99, the closing member 26 and sealing members 27B therebetween to provide a sealed connection and a substantially tight hydraulic motor housing. The closing member is fastened to the wheel ring by means of a snap ring 113 arranged in a groove in the wheel ring holding a flange 115 of the closing member to abut against a sealing member 27B. In this way, well fluid surrounding the driving unit is kept out of the hydraulic motor housing 93. The hydraulic motor 23 is thus comprised in the same housing as the wheel assembly 90 so that the motor housing and the wheel housing are the same housing and thus the same fluid chamber. The solution of the present invention is thus very compact in order that the arm assembly 60 with the wheel assembly 90, when retracted in the driving unit housing 51, only takes up little space, so that the diameter of the driving unit 11, and thus of the downhole tool, is not substantially increased when there are wheels at the end of the arms 60 of the driving unit 11.

The driving unit 11 has a unit diameter $D_u$, as shown in FIG. 1, and the wheel assembly 90 has a wheel diameter $D_w$ and a width W, as shown in FIG. 2, the width W being less than ½ the unit diameter, preferably less than ⅓ the unit diameter, more preferably less than ¼ the unit diameter.

The closing member 26 is directly connected with the hydraulic cylinder block for transmitting the rotational force of the hydraulic motor 23 to the wheel ring 99 in order to move the driving unit 11 forward in the well. In FIGS. 7A and 7B, the hydraulic motor 23 is a radial piston motor in which the rotatable section 84 is a hydraulic cylinder block. The hydraulic cylinder block has cylinders 83 in which at least four pistons 82 move radially in relation to a wheel rotational axis of the wheel assembly 90 for providing the rotational force. The wheel arm 81 comprises fluid channels 85 for providing fluid to and from the hydraulic motor 23 through the stationary part 91 of the wheel assembly 90.

Figure 8A:
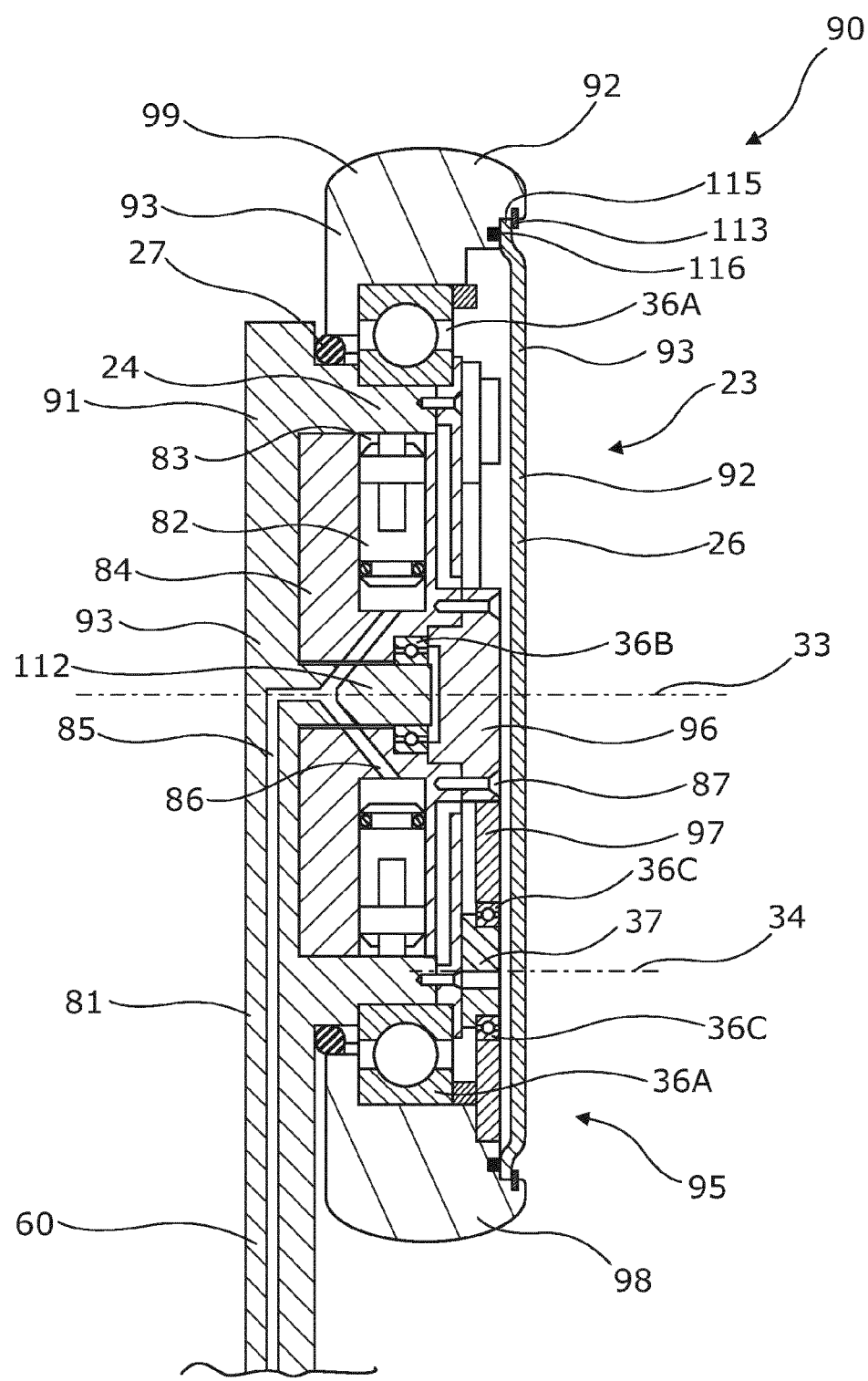
FIG. 8A shows a cross-sectional view of another embodiment of the wheel.
Figure 8B:
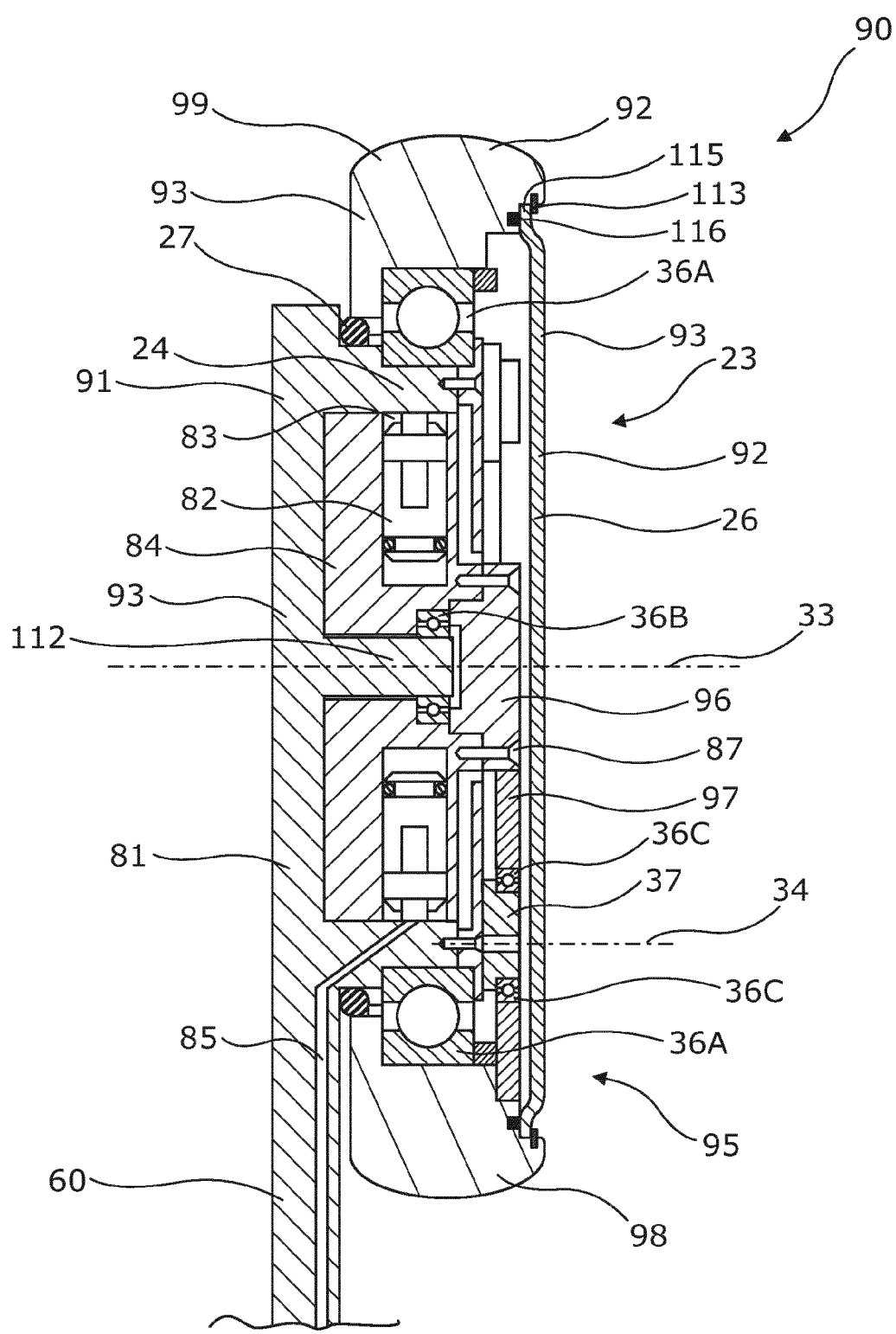
FIG. 8B shows another cross-sectional view of the wheel of FIG. 8A.
Figure 9:
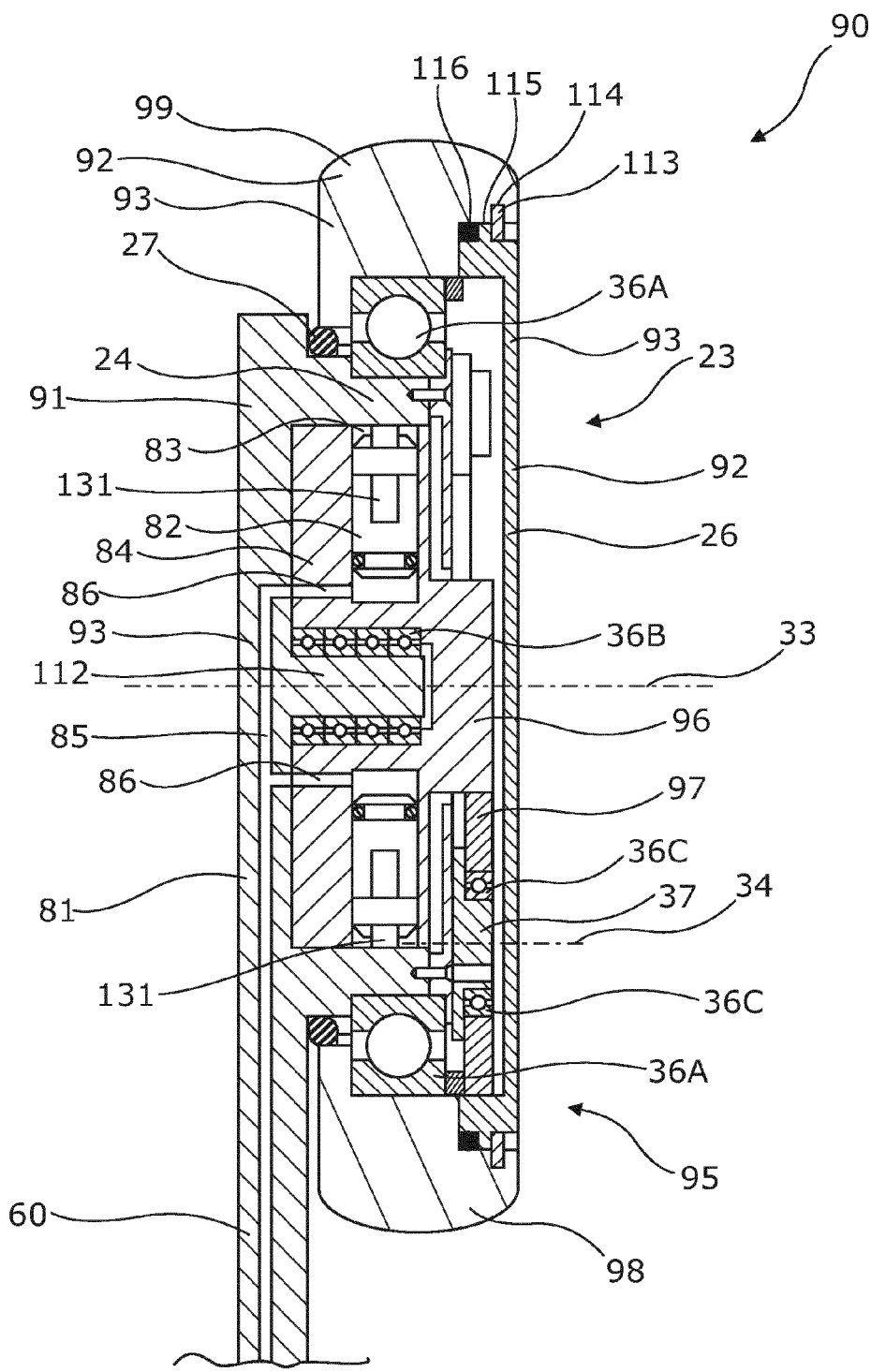
FIG. 9 shows a cross-sectional view of another embodiment of the wheel.

The wheel assembly 90 of FIGS. 8A-9 further comprises a planetary gearing system 95 comprised in the hydraulic motor housing 93, and the rotatable section 84 of the hydraulic motor 23 is connected with a sun gear 96 of the planetary gearing system 95 by means of screws 87.

FIGS. 8A and 8B show a cross-sectional view of the wheel assembly 90 arranged in one end of the arm assembly, as shown in FIGS. 3 and 4, in which the wheel assembly 90 also comprises a hydraulic motor 23 where the stationary part 91 and the rotational part 92 constitute the hydraulic motor housing 93 of the hydraulic motor 23. The arm assembly 60 comprises the wheel arm 81, and the stationary part 91 constitutes part of the wheel arm 81 as the cam ring 24 is formed as part of the wheel arm 81.

Also, in FIGS. 7A-9, the hydraulic motor 23 is a radial piston motor in which the rotatable section 84 is a hydraulic cylinder block having cylinders 83 in which at least six pistons 82 move radially in relation to a wheel rotational axis of the wheel assembly 90. The wheel arm comprises fluid channels 85 for providing fluid to and from the hydraulic motor 23 through the stationary part 91 of the wheel assembly 90 in order to rotate the wheel 61 (shown in FIGS. 1 and 3) of the driving unit and thus the driving unit.

In FIGS. 5A, 7A and 8A, the pistons move in the cylinders forced outwards by the hydraulic fluid from the fluid channel 86 in the hydraulic cylinder block 84. This is due to the fact that the fluid channels 85 in the stationary part 91 are arranged opposite fluid channels 86 in the hydraulic cylinder block 84 so that fluid flows into the back of the cylinder and forces the piston outwards. Other pistons in the hydraulic cylinder block 84 are moved in the opposite direction by lobes in the cam ring forcing the pistons back into the cylinder as shown in FIGS. 5B, 7B and 8B. In FIGS. 5B, 7B and 8B, other fluid channels 85 in the stationary part 91 are arranged opposite the front of the cylinder so that fluid in the cylinder can be emptied and the piston moved towards the centre of the hydraulic cylinder block 84. In this way, the hydraulic cylinder block 84 rotates.

As shown in FIGS. 8A and 8B, a ball bearing 36B is arranged between a projecting shaft 112 of the stationary part 91 of the wheel assembly 90 and the rotatable section 84 of the hydraulic motor 23. The shaft is stationarily arranged inside the hydraulic cylinder block and forms part of the wheel arm 81 or is connected with the wheel arm 81. The ball bearing 36B is arranged around the shaft and in a recess in the hydraulic motor block.

The closing member 26 has indentations matching recesses in the hydraulic cylinder block for transmitting the rotational force from the hydraulic cylinder block to the wheel ring 99. In FIG. 9, the hydraulic cylinder block drives the wheel ring via the closing member 26. In FIG. 9, the closing member 26 is fastened to the wheel ring 99 by means of the snap ring 113 arranged in a groove 114 of the wheel ring 99 to keep a projecting flange 115 of the closing member firmly fastened to the wheel ring 99. In between the flange of the closing member 26 and the wheel ring 99, a sealing member 116 is arranged for sealing the motor housing. In order to transmit the rotational force of the hydraulic motor block 84, the closing member 26 comprises projections which are flanges increasing the diameter of the closing member 26, the projections corresponding to indentations in the wheel ring 99.

In FIGS. 5A-5B and 8A-8B, the planetary gearing system 95 comprises a sun gear 96 fastened to the rotatable hydraulic cylinder block by means of screws. The sun gear 96 drives the planet gears 97 which are connected through a carrier member 37, such as a carrier plate, enabling the carrier member 37 to drive a ring gear 98 of the planetary gearing system 95. The wheel ring 99 comprises the ring gear 98, allowing the planet gears 97 to engage and drive the wheel ring 99. The carrier member 37 is screwed into the stationary part 91 and is thus stationary. The planet gears rotate around a planet gear rotational axis 34 and are rotatably connected with the carrier member 37 through a ball bearing 36B arranged between a projecting part of the carrier plate 37 and a hole in the planet gear. The planet gears mesh with the wheel ring 99 which, accordingly, functions as the ring gear 98 of the planetary gearing system 95.

The planetary gearing system 95 is comprised in the hydraulic motor housing 93 and is connected directly to the hydraulic motor block. Thus, the hydraulic fluid inside the hydraulic cylinder block also surrounds the gears of the planetary gearing system 95 as they are comprised in the same motor housing. By arranging the planetary gearing system 95 directly in the hydraulic motor housing 93, the width W of the wheel along the rotational axis 33 of the wheel assembly 90 is substantially reduced in relation to a solution where a planetary gearing system is arranged outside the hydraulic motor housing 93 in e.g. a separate housing comprising the motor housing. A small wheel width provides a smaller diameter $D_u$ of the driving unit, enabling the driving unit to enter also small diameter wells.

In FIG. 9, the sun gear 96 is provided as part of the hydraulic cylinder block. The planet gears mesh with the closing member 26 which, accordingly, functions as the ring gear 98 in the planetary gearing system 95. Thus, the wheel ring 99 is driven by the hydraulic cylinder block by driving the planet gears 97 which drive the closing member 26 driving the wheel ring 99.

The planet gears 97 are connected through the carrier member 37 which is connected to the stationary part 91, thus making it stationary. Furthermore, four ball bearings 36B are arranged between the projecting part 112 of the stationary part 91 and the rotatable section of the hydraulic motor. In this way, the sun gear 96 can be made as part of the rotatable section.

Figure 11:
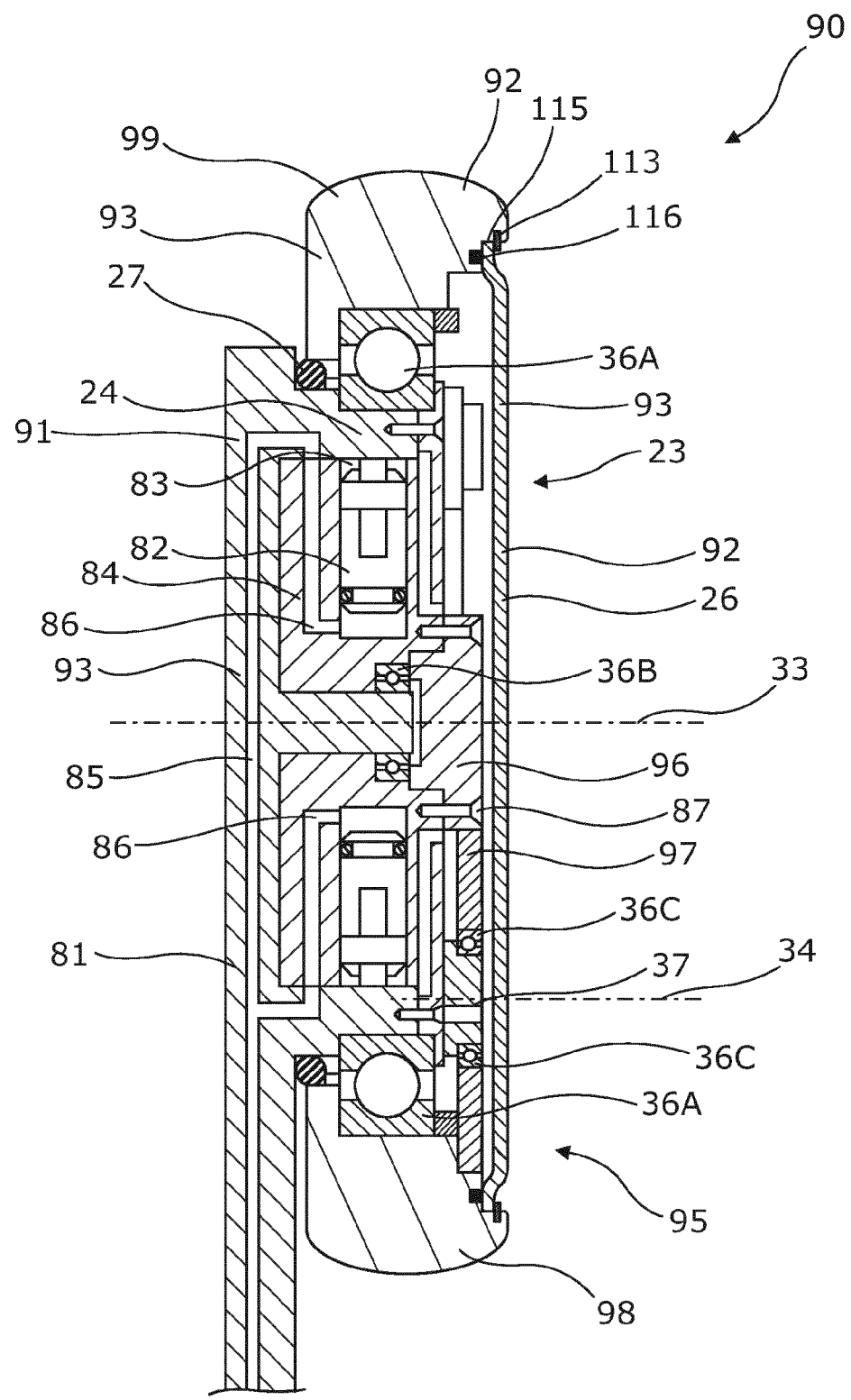
FIG. 11 shows a cross-sectional view of yet another embodiment of the wheel.

In FIG. 11, the fluid channels for providing fluid to the hydraulic motor in the wheel housing are arranged differently than in FIG. 9 to enable radial supply of the fluid channel to the hydraulic motor block.

Figure 12:
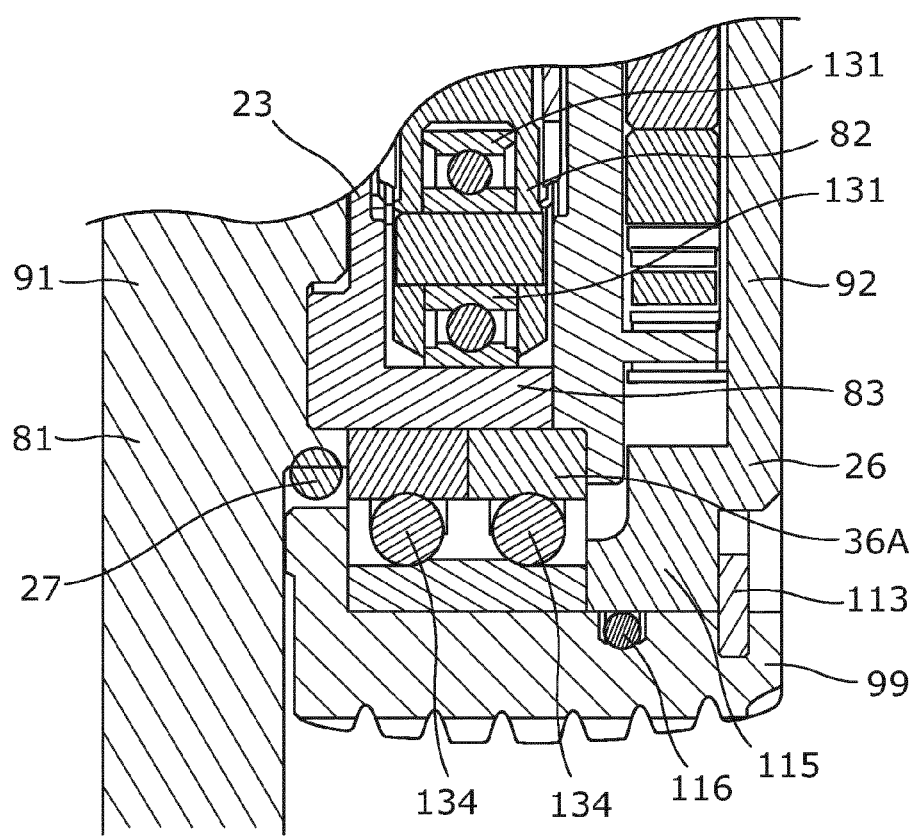
FIG. 12 shows a cross-sectional view of part of another embodiment of the wheel.

The wheel ring 99 rotates around the stationary part 91, and a ball bearing 36A is arranged therebetween. In FIG. 12, the ball bearing 36A comprises two rows of balls 134. In another embodiment, the ball bearings 36A, 36B may be replaced by needle bearings. As can be seen in FIG. 12, the pistons 82 of the hydraulic motor comprise ball bearings 131 arranged in one end opposite the end of the piston 82 moving within the cylinder.

Figure 13:
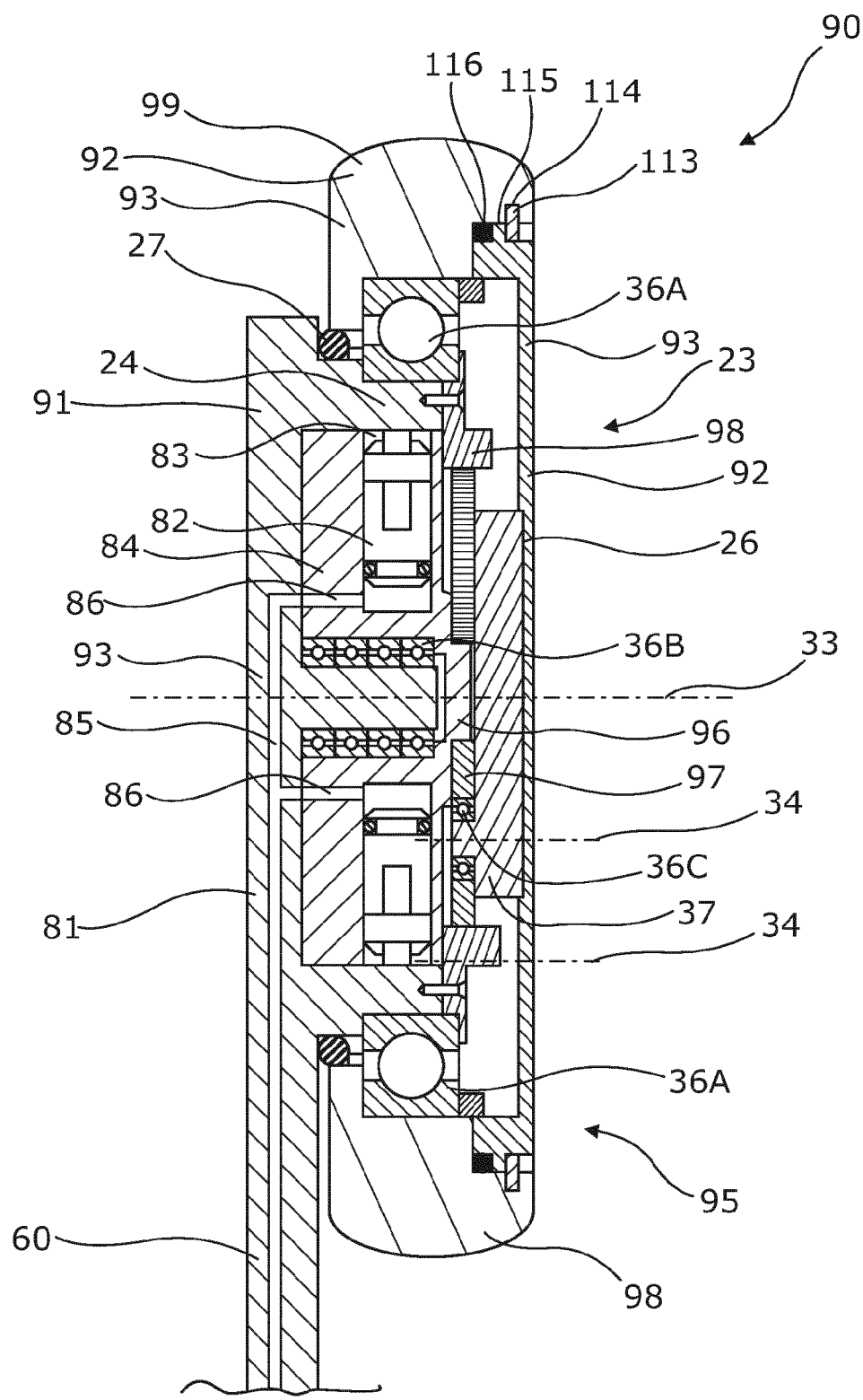
FIG. 13 shows a cross-sectional view of another embodiment of the wheel.

In FIG. 13, the rotatable section comprises the first sun gear 96 of the planetary gearing system 95 so that the sun gear forms part of the rotatable section 84 of the hydraulic motor 23 and drives the plurality of planet gears 97 which are connected through the carrier member 37. The carrier member 37 is connected with the wheel ring 99, and the stationary part 91 comprises the ring gear 98 of the planetary gearing system 95, enabling the ring gear 98 to engage the planet gears 97 driving the carrier member 37 and thus the closing member of the wheel ring. The ring gear 98 is fastened to the stationary part 91 and is thus stationary.

Figure 15:
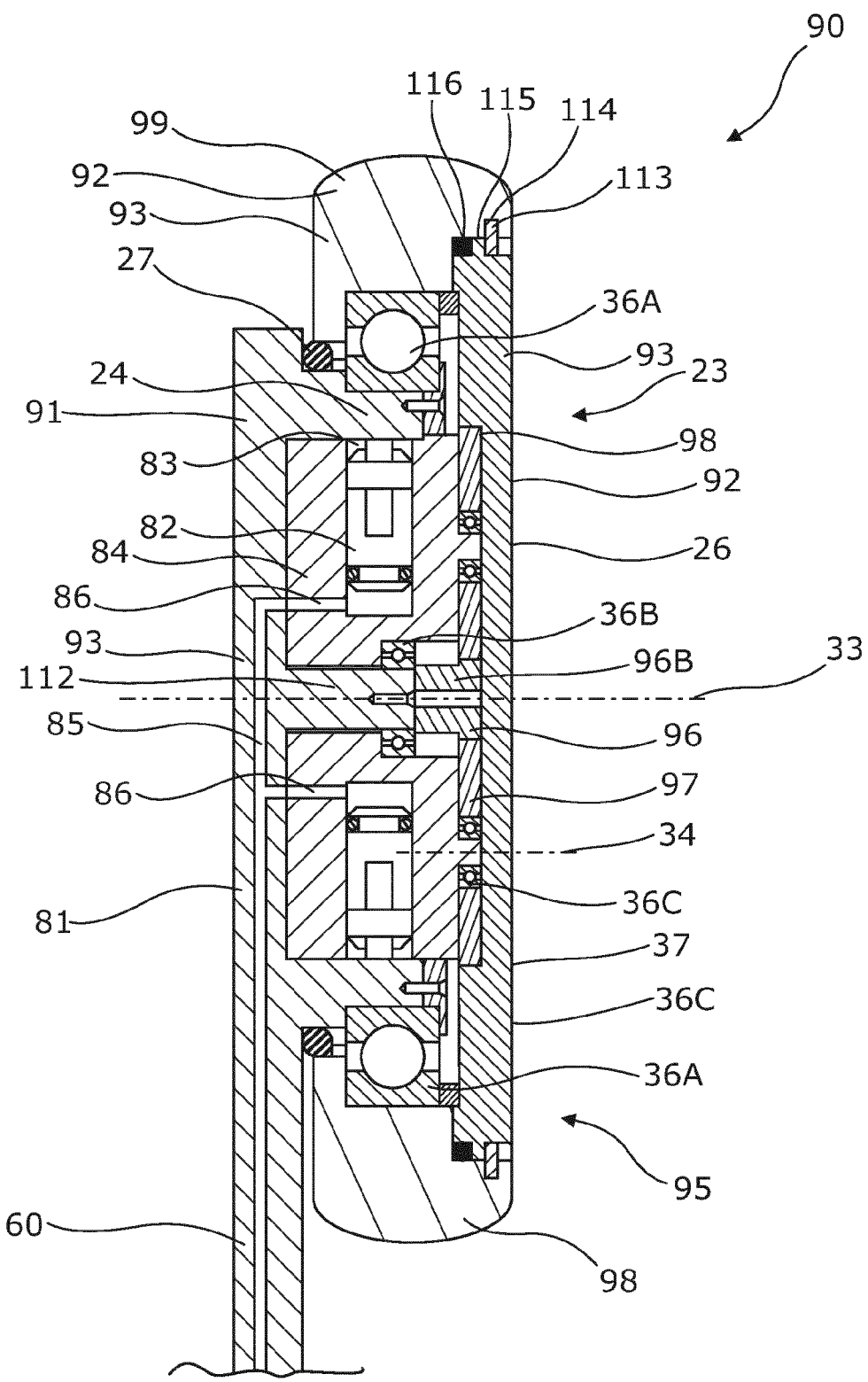
FIG. 15 shows a cross-sectional view of yet another embodiment of the wheel.

In FIG. 15, the rotatable section 84 of the hydraulic motor is connected with the planet gears 97, and the planet gears are thus driven by the rotatable section around the sun gear 96 fastened to a centre part 112 of the stationary part 91. The sun gear 96 is fastened to the centre part 112 around which part the rotatable section 84 of the hydraulic motor rotates. The rotatable section 84 has projections connected with the planet gears 97 through ball bearings 36C. The planet gears 97 engage the ring gear 98 which forms part of the closing member 26 connected with the wheel ring 99 through a snap ring 113. The rotatable section 84 rotates the planet gears 97 rotating around the stationary sun gear 96 engaging the ring gear 98 being comprised in the closing member 26.

Figure 14:
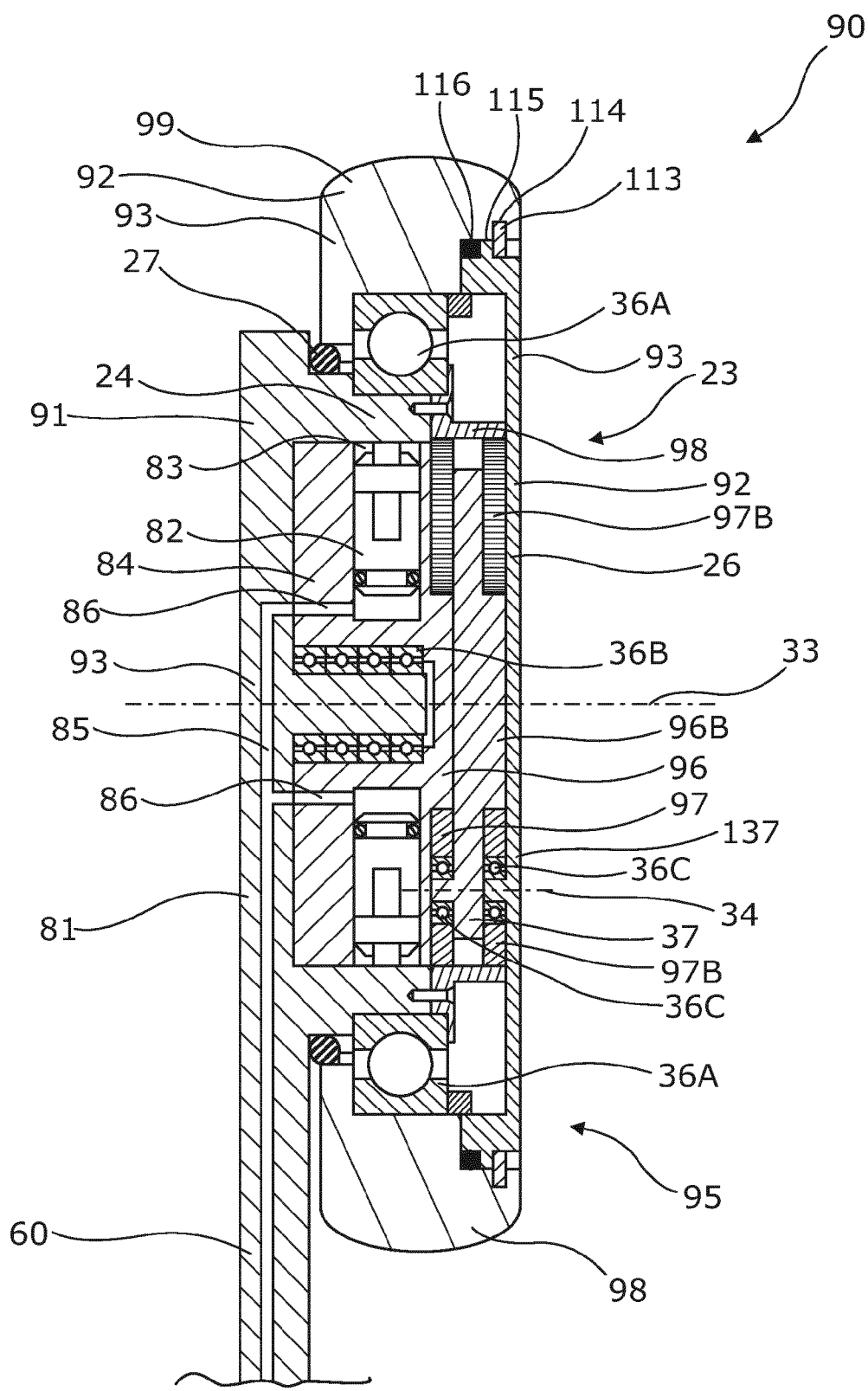
FIG. 14 shows a cross-sectional view of another embodiment of the wheel comprising a double gear.

In FIG. 14, the wheel assembly 90 comprises a double gearing system. The rotatable section 84 of the hydraulic motor 23 comprises the first sun gear 96 of the planetary gearing system 95. Thus, the sun gear 96 is a projecting part of the rotatable section 84 and drives a plurality of first planet gears 97 which are connected through a carrier member 37. The carrier member 37 has projections on one side connected with the first planet gears 97 of the planetary gearing system 95 through ball bearings 36C. On the other side, the carrier member 37 has one projecting part forming a second sun gear 96B driving a plurality of second planet gears 97B. The first planet gears 97 and second planet gears 97B engage a stationary ring gear 98 fixedly connected with the stationary part 91 by means of screws. The ring gear 98 is also used to fasten the ball bearing 36A between the wheel ring 99 and the stationary part 91.

The second planet gears 97B are connected by means of a second carrier member 137 which is part of the closing member being connected with the wheel ring 99 by means of a snap ring 113 for rotating part of the wheel assembly 90. Thus, the second carrier member 137 is connected with the rotational part 92 of the wheel assembly 90 or is part of the rotational part 92.

Figure 16:
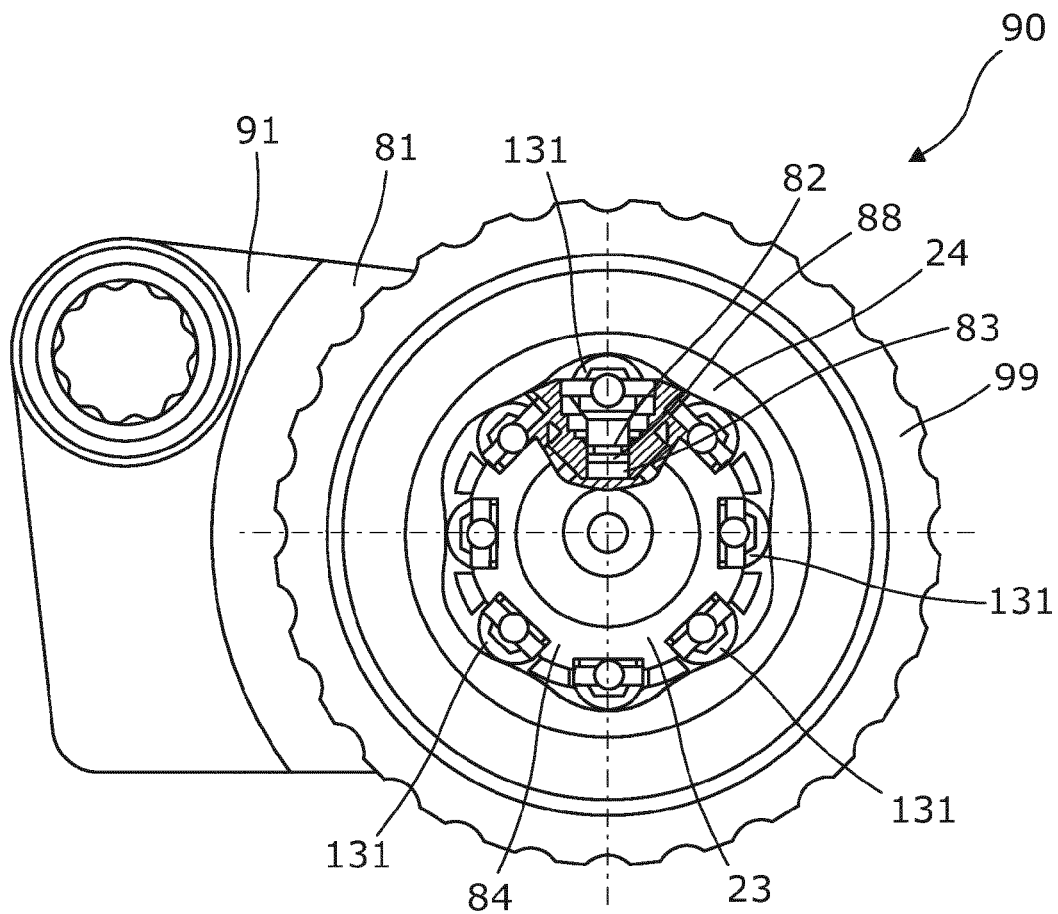
FIG. 16 shows another partly cross-sectional view of the hydraulic motor within the wheel.

In FIG. 16, the wheel assembly 90 is seen in a partly cross-sectional view showing the cam ring 24 and the pistons 82 of the hydraulic motor. The closing member 26 has been removed for illustrative purposes. As can be seen, the pistons 82 moves in each of the cylinders 83 in the hydraulic cylinder block. Each piston 82 comprises a piston body 88 and a ball bearing 121 is suspended in the piston body so that the ball bearing 121 contacts the inner surface of the cam ring 24. When one piston 82 is forced outwards by hydraulic fluid in the fluid channels 86, another piston is forced inwards in the cylinder towards the rotational axis of the rotatable section of the hydraulic motor by the cam ring 24.

Furthermore, the fluid channels 86 in the hydraulic cylinder block supplying fluid to the motor are substantially parallel with the rotational axis of the wheel. The wheel arm 81 comprises fluid channels 85 aligned with the fluid channels 86 in the hydraulic cylinder block so that the fluid can flow freely from the arm to the motor when fluid is supplied to force the piston 82 of the hydraulic piston motor radially outwards. However, the fluid channels 85, 86 are unaligned when the piston 82 is no longer moved outwards. Then the fluid channels have moved to the next piston to be forced outwards in order to drive the rotatable section 84 of the hydraulic motor to rotate around the rotatable axis. Only the channels supplying fluid to the motor are shown. However, other channels are arranged in the arm in order for the fluid to flow into said other channels when the cylinder is emptied when the piston 82 moves inwards towards the rotational axis. By having the fluid channels of the hydraulic cylinder block substantially parallel to the rotational axis of the wheel, the fluid channels are much easier to manufacture.

In order to be able to roll along the cam ring 24, the pistons moving in the cylinders of the hydraulic cylinder block are provided with a ball bearing 131. The central part of the ball bearing is suspended in a piston body of the piston and an outermost part of the ball bearing abuts the cam ring, the ball bearing thus being capable of rotating in relation to the piston.

Figure 10:
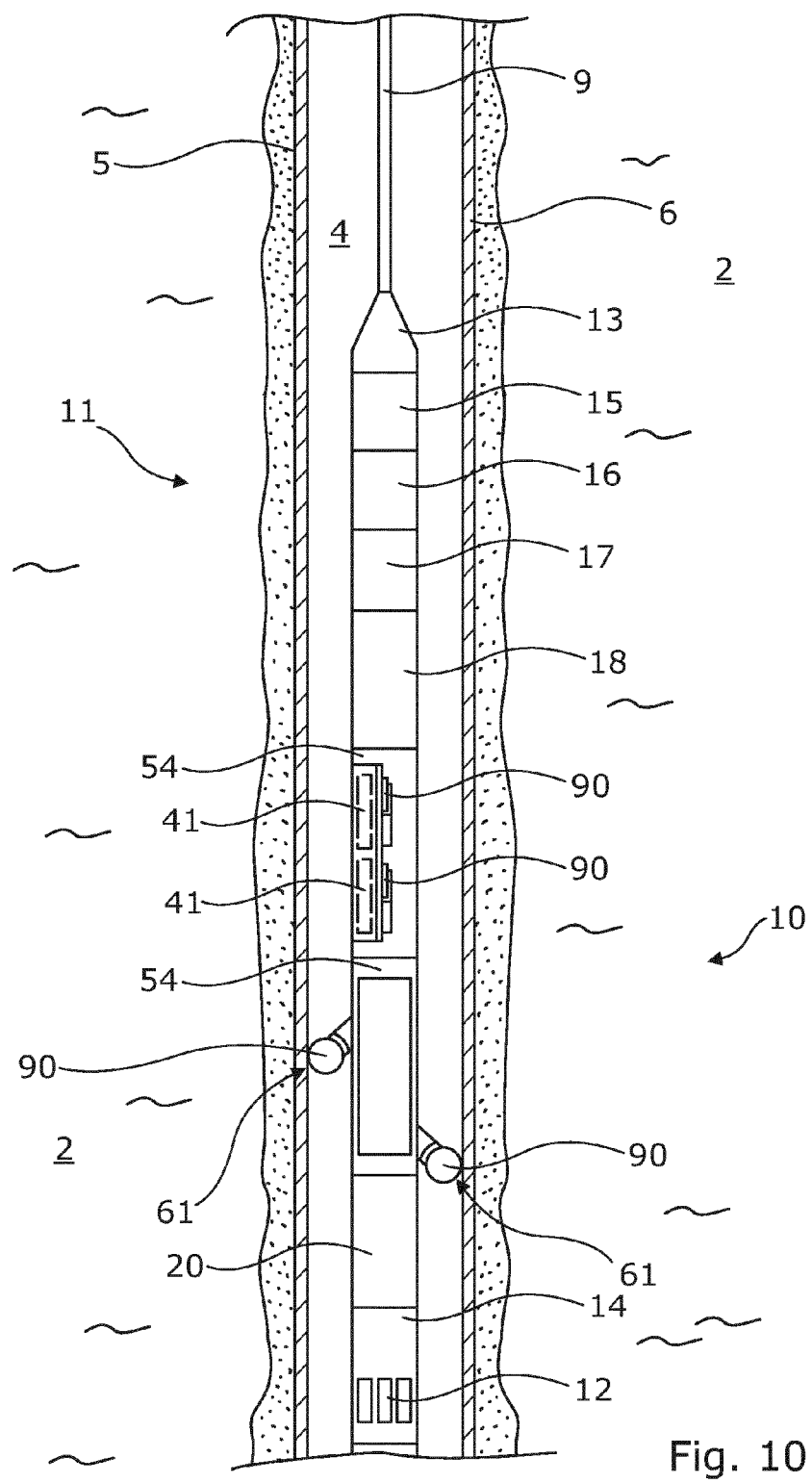
FIG. 10 shows a downhole system.

The invention further relates to a downhole system as shown in FIG. 10, in which the driving unit 11 is connected to an operational tool which, in this case, is a logging tool logging fluid and formation data.

By well fluid is meant any kind of fluid that may be present in oil or gas wells downhole, such as natural gas, oil, oil mud, crude oil, water, etc. By gas is meant any kind of gas composition present in a well, completion, or open hole, and by oil is meant any kind of oil composition, such as crude oil, an oil-containing fluid, etc. Gas, oil, and water fluids may thus all comprise other elements or substances than gas, oil, and/or water, respectively.

By a casing is meant any kind of pipe, tubing, tubular, liner, string etc. used downhole in relation to oil or natural gas production.

Although the invention has been described in the above in connection with preferred embodiments of the invention, it will be evident for a person skilled in the art that several modifications are conceivable without departing from the invention as defined by the following claims.

The invention claimed is:

1. A downhole driving unit for insertion into a well, comprising:
   a driving unit housing;
   a hydraulic motor comprising a hydraulic motor housing; and
   a wheel assembly comprising a stationary part and a rotational part, the stationary part being connected with the driving unit housing and being rotatably connected with the rotational part, the stationary part and the rotational part constituting the hydraulic motor housing, the rotational part comprising a wheel ring closed from one end, the wheel ring having an exterior that contacts an inner wall of the well in at least a vertical or horizontal part when in operation; and
   a sealing member;
   wherein the wheel assembly comprises a spring member assembling the hydraulic motor housing; and
   the spring member assembles the hydraulic motor housing by connecting the stationary part with the rotational part or by connecting a first part of the rotational part with a second part of the rotational part, so that the sealing member is in sealing engagement with both the stationary part and the rotational part, or in sealing engagement with the first part and the second part of the rotational part to form the hydraulic motor housing.

2. The downhole driving unit according to claim 1, wherein the first part is the wheel ring and the second part is a closing member closing the wheel ring from the one end.

3. The downhole driving unit according to claim 1, wherein the stationary part is a cam ring of the hydraulic motor.

4. The downhole driving unit according to claim 1, wherein the wheel assembly further comprises the sealing member arranged between the stationary part and the rotational part or between a first part of the rotational part and a second part of the rotational part.

5. The downhole driving unit according to claim 1, wherein the spring member is a circlip or a snap ring.

6. The downhole driving unit according to claim 1, wherein the hydraulic motor is a radial piston motor.

7. The downhole driving unit according to claim 1, further comprising an arm assembly movable between a retracted position and a projecting position in relation to the driving unit housing, and wherein the arm assembly is connected with or forms part of the stationary part of the wheel assembly.

8. The downhole driving unit according to claim 7, further comprising an arm activation assembly arranged in the driving unit housing for moving the arm assembly between the retracted position and the projecting position.

9. The downhole driving unit according to claim 1, wherein the wheel assembly further comprises a planetary gearing system.

10. The downhole driving unit according to claim 9, wherein the planetary gearing system is comprised in the hydraulic motor housing.

11. The downhole driving unit according to claim 9, wherein the hydraulic motor has a rotatable section which is connected with a sun gear of the planetary gearing system.

12. The downhole driving unit according to claim 11, wherein the sun gear of the planetary gearing system drives a plurality of planet gears which are connected through a carrier member for driving a ring gear of the planetary gearing system.

13. The downhole driving unit according to claim 9, wherein a rotatable section of the hydraulic motor is connected with the planet gears and the planet gears are driven by the rotatable section.

14. The downhole driving unit according to claim 9, wherein a rotatable section of the hydraulic motor comprises a first sun gear of the planetary gearing system and the first sun gear drives a plurality of first planet gears which are connected through a carrier member.

15. The downhole driving unit according to claim 14, wherein the carrier member of the planetary gearing system drives a plurality of second planet gears and the carrier member comprises a second sun gear engaging and driving the second planet gears.

16. The downhole driving unit according to claim 15, wherein the second planet gears are connected by means of a second carrier member being part of the rotational part for rotating part of the wheel assembly.

17. The downhole system comprising the driving unit according to claim 1 and an operational tool connected with the driving unit for being moved forward in a well or borehole.

18. The downhole system according to claim 17, wherein the operational tool is a stroker tool, a key tool, a milling tool, a drilling tool, a logging tool, etc.

19. Use of the driving unit according to claim 1 in a well or borehole for moving itself and/or an operational tool forward in a well or borehole.

* * * * *